Patented Feb. 3, 1931

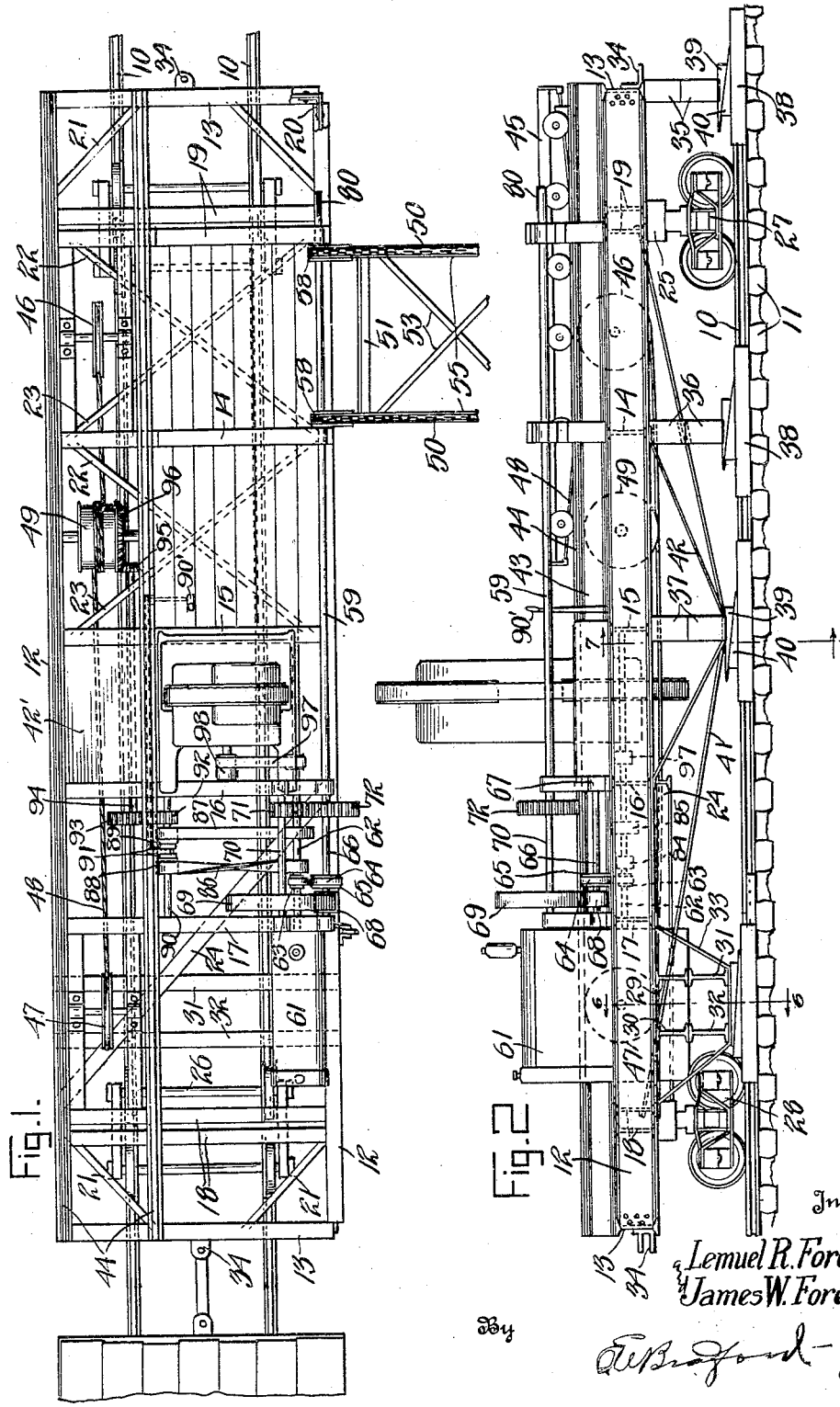

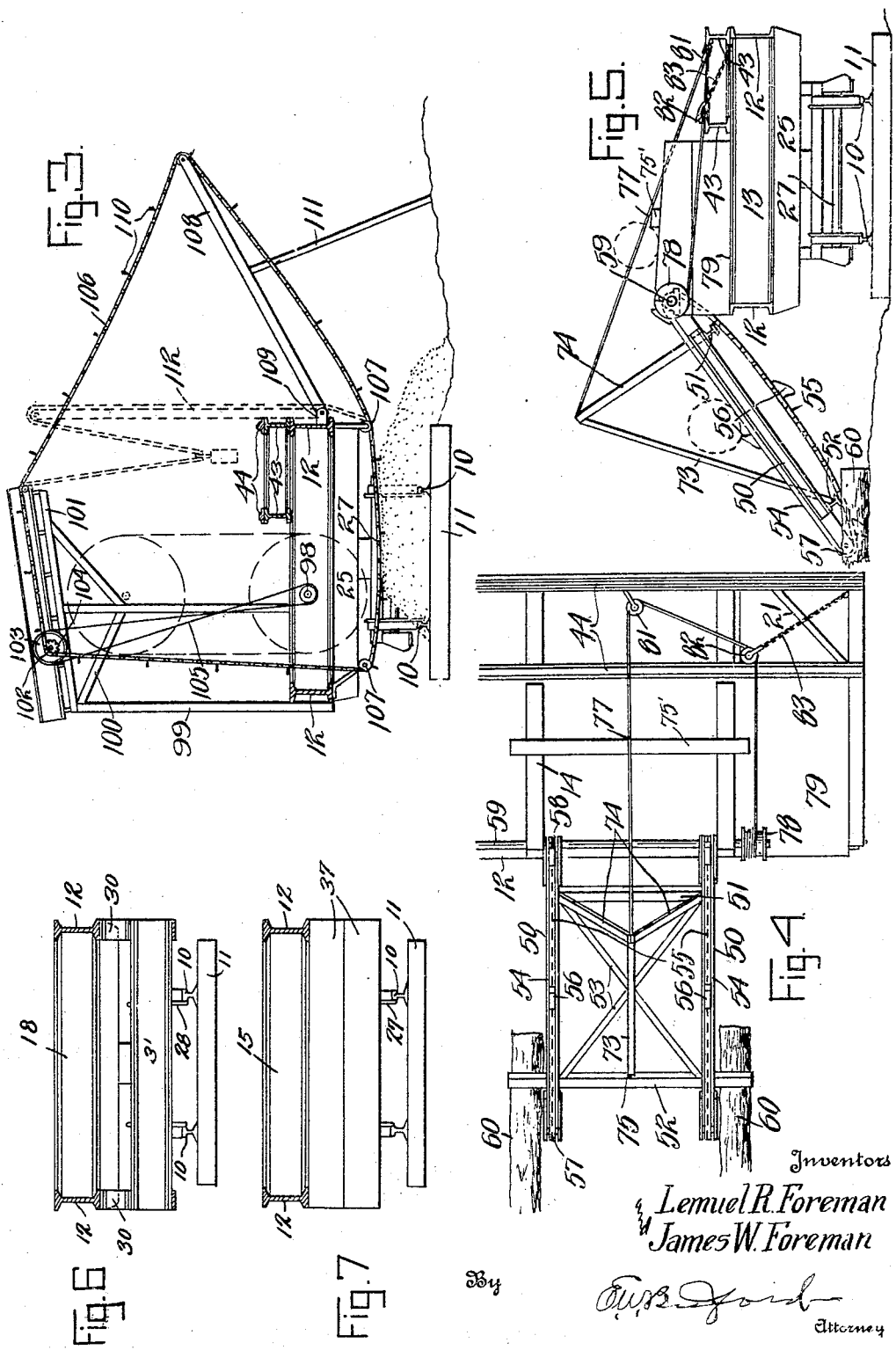

1,791,406

UNITED STATES PATENT OFFICE

LEMUEL ROSCOE FOREMAN AND JAMES W. FOREMAN, OF ELIZABETH CITY, NORTH CAROLINA

SAWMILL MOUNTING

Application filed July 6, 1929. Serial No. 376,433.

Our invention relates to saw mills, and particularly to method and means for mounting a sawmill so that it may readily be moved from place to place.

In carrying out our invention, we provide a flat car so constructed as to be adapted for mounting a suitable band or circular saw thereupon, together with means for loading the logs upon the car and for discharging the sawed lumber from the saw to an adjacent car on which it is transported from the woods.

An object of the invention is to provide a saw mounted on a car which may be run into the woods and readily moved from place to place so as to make it unnecessary to carry the logs a long distance to the mill. Our improvement makes it necessary to haul only the cut or manufactured lumber. By taking the mill into the woods, the operator is able to cut into useful lumber portions of trees which heretofore were wasted because of the expense of transporting them together with waste material in them to a distant mill.

Further objects are to provide improved means for its mounting so as to require a minimum number of operators and thus reduce labor cost with a resultant saving in the cost of the lumber.

Further objects and advantages will become apparent as the description proceeds.

Referring to the accompanying drawings, which are made a part hereof, and on which similar reference characters indicate similar parts, Figure 1 is a plan view of the saw mill and its mounting, Figure 2 is a side elevation of the same, Figure 3 is an end elevation, showing the saw dust conveyor, Figure 4 is a plan view of one end of the car, showing the loading apparatus with the means for elevating it secured thereto, and Figure 5 is an end elevation of the car, showing the loading apparatus in position to be lifted upon the car preparatory to moving the car.

Figure 6 is a section on line 6—6 of Figure 2, and

Figure 7, is a section on line 7—7 of Figure 2.

In the drawings, numerals 10 and 11 indicate the rails and ties respectively of the railroad track such as ordinarily used in log woods operation. It may be standard or any other gage. 12 and 13 denote side beams and end beams respectively of a car frame. 14, 15, 16 and 17 denote cross beams similar in structure to the side beams 12. At 18 and 19 pairs of cross beams are provided for supporting the mill on trucks 27 and 28, these individual beams being similar in structure to the side beams 12. The side and end beams 12 and 13 are secured at their ends to each other by means of angle irons 20 securely riveted or bolted to the beams to provide a rigid and secure construction. The ends of the cross beams 14, 15, 16 and 17 and the pairs of beams 18 and 19 are likewise secured to the side beams 12 by means of angle irons and rivets and bolts. The ends 13 and the sides 12 are further strengthened by braces 21 which braces are riveted or bolted at their ends to the end and side beams respectively, to take care of draft when moving the mill with a locomotive. Cross braces 22 and 23 secured at their opposite ends to the opposite ends of adjacent cross beams serve further to brace the framework of the car. A brace 24 of substantial strength is secured beneath the cross beams 16 and 17 and one of the pairs of cross beams 18 to thoroughly brace this end of the car in order that the frame may hold the engine and the saw firm and steady. It is necessary to use a brace similar to brace 24 instead of braces 22 and 23 because it is necessary to mount the engine low enough to allow an extension of the drive shaft to be low enough to get a driving connection with the saw beneath the husk frame of the mill; also to keep the belt drives for the carriage frictions underneath the floor level. We may however mount the engine directly upon the main frame of the machine by putting in an auxiliary drive connection between the main shaft of the engine and the saw, in which case brace 24 may be dispensed with and we may use braces 22 and 23. Brace 24 is preferably an H-beam and passes beneath the cross beams 16 and 17, to the under side of which it is riveted or bolted. The pairs of cross beams 19 and 18 rest upon car trucks 27 and 28, these trucks being standard freight or log car equipment. Bolted to the under side of the side beams 12 are spaced blocks 29 and 30. Cross beams 31 and 32 are strong beams. In the machines built we have made them about twelve inches deep. They are secured to the under side of the blocks 29 and 30, for supporting the engine 61. A bracing band 33 is secured at each end to the under side of the beams 12 and passes beneath the cross beams 31 and 32 and assists in holding these beams in a secure position. The purpose of the blocks 29 and 30 is to space the beams 31 and 32 in low enough position so the engine shaft 62 will be low enough for silent chain drive for band mill to pass under the husk of the mill and also to keep the belts 86 and 87 under the floor. Link and pin or M. C. B. couplers of regular structure are secured at 34 to the end beams 13. Secured to the under side of the frame are heavy cross timbers 35, 36 and 37. These timbers extend well down toward the top of the rails 10. Placed upon the ends of the ties are blocks 38, each long enough to be supported on three ties. Wedges 39 and 40 are driven between the blocks 38 and the cross timbers 35, 36 and 37 and beams 31 and 32. The purpose of the beams 35, 36, 37, 31 and 32 and the blocks 38 and wedges 39 and 40 is to provide quick means for leveling sideways and a rigid mounting for the frame of the car, and so that the weight will be partially carried by the ties instead of wholly by the rails 10 and the running gear. Long bracing rods 41 are secured at their ends in the cross beams 18 and 19 and pass through the timber 36 and beneath the cross timbers 37. These rods assist in supporting the weight of the car to keep the same from sagging when moving. The car is stopped on comparatively level track, therefore it is unnecessary to provide means for leveling it endwise. The engine may be mounted on the side beams 12 or on the floor level by using an extra drive from the engine to the shaft 62. When so mounted, one beam such as beam 35 is used in place of beams 31 and 32. Braces 42 of substantial strength are secured at their opposite ends to the under side of the side beams 12 and pass beneath and are secured to the cross beams 37. The purpose of the supporting braces 42 is to secure the cross beams 37 firmly in position in case the car should become derailed while in motion. The beams 37 serve as a guard against injury to the saw wheel since these beams will strike the top of the rail and support the saw, and thus prevent injury to it, such as would occur if the body of the car dropped down any considerable distance nearer the track. A steel plate 42' is placed between the cross beams in front of the saw. This plate serves as an additional brace for the frame and is made necessary because braces similar to 22 and 23 cannot be used. Because of the necessity for true alignment of carriage tracks and saw in order to produce well manufactured lumber, it has heretofore been thought impracticable to operate a portable sawmill, because there has not been any method for aligning quickly and holding same in a fixed position. Our invention provides a car so rigidly built that when the two ends are brought in a level sidewise position by means above described, all machinery is then in line and it is only necessary to support the center of the car to help take care of any vibration. Along the top of one side of the car, and spaced apart, are beams 43 substantially H-shaped in cross section. These beams have tracks 44 secured upon their upper sides and a log carriage 45 of conventional construction is mounted to travel upon the tracks 44. Suitably mounted between the beams 43 are idle pulleys 46 and 47 over which pass a cable 48, which cable is wound a few times around a drum 49. The ends of the cable are secured beneath the ends of the carriage 45, the cable providing means for moving the carriage to and fro upon its track in a manner well known in the sawmill art. Means for loading the logs upon the car are shown in Figs. 4 and 5, and consist of a frame constructed of substantial beams 50, preferably iron beams H-shaped in cross section. These beams are secured together by cross beams 51 and 52 which are similar to the beams 50 and are riveted or otherwise secured to the under side of the beams 50. Cross braces 53 preferably of angle iron, make for a further rigid construction of this device. The beams 50 have track members 54 bolted on their upper side by means of countersunk bolts or screws, these providing a track for a log conveyor chain 55, the log conveyor having dogs 56 spaced along it. The conveyor 55 passes around idle sprockets 57 mounted in the lower ends of the beams 50. A driving sprocket 58 is secured upon a shaft 59. The beam 52 may have its ends extended beyond the beams 50 and rest upon logs as shown at 60. Means for driving the loading chain 55 just described will now be described:

Mounted so as to rest upon the cross beams 31 and 32 is an engine 61 of any suitable kind, here shown as an internal combustion engine. This engine is secured against displacement between the beams 17 and 18 and has a main drive shaft 62 which shaft may be journaled at its outer end in any one of the beams 15, 16 and 17 or in all of them. The shaft 62 carries a small pulley 63 around which passes a belt 64 which belt drives a pulley 65 upon a shaft 66. One end of this shaft 66 is journaled in a bearing 67 and the other end of the shaft carries a friction pulley 68 which engages a large wheel 69 on a shaft 70. The other end of the shaft 70 has a small pinion 71 thereon which meshes with a large pinion 72 on the shaft 59. The friction pulley 68 is normally out of contact with the large wheel 69. When however the operator wishes to drive the loading device he moves the large wheel 69 into engagement with friction pulley 68. The shaft 59 is then driven from the main engine shaft through the shaft 62, pulley 63, belt 64, pulley 65, shaft 66, friction pulley 68, wheel 69, shaft 70, pinion 71 and pinion 72. The driving connection just described may also be used in lifting the loading mechanism to swing it upon the car in position to move the car from one place to another. A tripod consisting of a leg 73 and legs 74 may have the leg 73 secured at 75 to the cross timber 52 and the legs 74 at 76 to the inside of the upper ends of the beams 50. The ends of the legs 74 rest on the cross brace 51 so that it is only necessary to secure the legs loosely to the beams 54 which is a saving in time when preparing to move. A cable 77 is secured to a drum 78 which is removably secured upon the end of the shaft 59 and keyed thereto by a loose key 80. The cable 77 passes through pulleys 81 and 82, pulley 81 being hooked to an eye secured to one of the side beams 43 and the fair leader pulley 82 being hooked in the end of a chain 83, the other end of the chain being secured near the end of the end beam 43. When the shaft 59 is rotated by the driving connection just described the cable 77 is wound up on the drum 78 so as to lift the log carrying frame and swing it vertically above the frame of the car. A timber 75' is placed on the log foundation and the legs 74 rest on this. The timber 75' may preferably be a piece of the log being sawed which has been left for that purpose. The legs 74 of the tripod are preferably substantially at right angles to the side beams 50 so that when the frame is swung upon the car to rest upon the timber 75' the frame is substantially vertically placed upon the car. When the car has been moved and set up for another sawing operation, the tripod is removed from the frame of the log loader and the drum 78 is slipped off the shaft 59 and the cable together with the pulleys 81 and 82 may be dropped in the space 79 on the end of the car, where they are out of the way and yet convenient when they are needed for another move.

The saw carriage 45 is of regular construction and is driven through the following drive connections: The engine shaft 62 has pulleys 84 and 85 driving belts 86 and 87 on pulleys 88 and 89, which pulleys are loosely mounted on a shaft 90. The belt 86 is crossed so that the pulleys 88 and 89 will revolve in opposite directions. A double end friction cone 91 is keyed to the shaft 90 and may be moved by a manually operable lever 90' along the shaft 90 to engage either of the pulleys 88 and 89 as desired. The shaft 90 has a pinion 92 engaging a pinion 93 on a shaft 94. A bevel gear 95 on the end of the shaft 94 meshes with a bevel gear 96 on the drum 49. A saw, here shown as a band saw, is mounted upon the cross beams 15 and 16 so that the lower end of the saw passes well down near the top of the rails of the track. This saw is driven from the shaft 62 by means of any suitable belt or chain driven connection 97. The outer end of the saw drive shaft carries a pulley 98 for driving a saw dust remover which will now be described:

The saw is protected by means of a roof supported on a framework consisting of posts 99, braces 100 and cross beams 101. A shaft 102 journaled in the timbers 101 carries a pulley 103 on one end and a sprocket 104 near the other. A belt 105 forms driving connection between the pulley 98 and the pulley 103 on the shaft 102. A chain 106 mounted to travel around a number of idle pulleys 107 is driven by the sprocket wheel 104. One of the idle pulleys is mounted in the outer end of a frame 108 which frame is pivotally secured at 109 to the side of the car. The chain 106 carries suitable slats 110 for dragging the saw dust out. The end of the frame 108 may rest upon a post or prop 111, to relieve tension of the chain. The chain 106 passes beneath and slightly below the lower band saw wheel. In operation the chain 106 drags the saw dust from beneath the saw to one side of the car. When the car is moved, the operator hangs a weight upon the chain 106 so as to swing the frame 108 to the position shown in dotted lines at 112. While the structure has been shown in use with a band saw, it should be distinctly understood that the invention is in no way limited to this kind of saw. Furthermore, while we have shown the frame of the car as supported upon heavy cross timbers, we do not limit ourselves to this method of bracing the car; and while we have shown and described a car as constructed of steel beams, we obviously do not limit ourselves to this material, as under some circumstances we might find it more convenient to build the whole framework of the car of wooden timbers. Obviously, we might find it convenient at times to support the side beams upon screw jacks or other blocks. One feature of economy in the operation of our device is that the lumber may be run directly from the saw upon a car and loaded for transportation to its destination without additional labor. This results in economy of labor.

The care and speed with which our mill may be moved and set up makes it practical to move the mill even very short distances.

By the use of our mill we are able to load the logs on the mill, manufacture them into lumber and discharge the lumber on a flat car with the same number of men now required in general practice to load logs on cars.

It will be obvious to those skilled in the art that various changes may be made in our device without departing from the spirit of the invention, and we, therefore, do not limit ourselves to what is shown in the drawings and described in the specification, but only as set forth in the appended claims.

Having thus fully described our said invention, what we claim as new and desire to secure by Letters Patent, is:

1. A saw mill mounting comprising a frame comprising side beams and end beams rigidly secured together, and a plurality of cross beams secured to and between the side beams, means for mounting an engine upon the frame, means for mounting a saw upon the frame, a loading device, means for driving at will the loading device from the said engine, and means adjacent said engine, saw and loading device for rigidly supporting the structure upon a firm foundation to relieve the respective beams from the weight of the load and from the vibration due to sawing, substantially as set forth.

2. A saw mill mounting comprising a pair of rigid side beams, a pair of similar rigid end beams, a plurality of cross beams secured to the side beams and spaced apart, means for bracing the side and cross beams to secure a rigid unyielding frame, means for mounting the frame on railroad trucks, and means for bracing below and supporting the frame on a rigid foundation independently of the railroad trucks, comprising cross timbers secured to the under side of the side beams and means for supporting the timbers on a firm foundation, substantially as set forth.

3. A saw mill mounting comprising a pair of rigid side beams, a pair of similar rigid end beams, a plurality of cross beams secured to the side beams and spaced apart, two of these beams providing a support for a saw, means for bracing the side and cross beams to secure a rigid unyielding frame, means for mounting the frame on railroad trucks, and means for bracing below and supporting the frame on a rigid foundation independently of the railroad trucks, part of the last named means being mounted and rigidly supported adjacent the mounting of the saw to provide protection for the saw in case the railorad trucks become derailed, substantially as set forth.

4. A saw mill mounting comprising an iron frame constructed of side and cross I-beams rigidly secured together, supporting braces secured to and beneath the cross beams, a large bracing and supporting diagonal cross beam, an engine mounted and secured beneath the side beams, means for bracing the corners of the frame, means for mounting the frame upon railroad trucks, and independent means for bracing below and supporting the frame upon the ties of the railroad track, one of said independent supporting means being placed adjacent the saw mounting and rigidly braced to prevent injury to the saw in case the car becomes derailed in transit, substantially as set forth.

5. A saw mill mounting comprising an iron frame constructed of side and cross I-beams rigidly secured together, supporting braces secured to and beneath the cross beams, a large bracing and supporting diagonal cross beam, an engine mounting secured beneath the side beams, means for bracing the corners of the frame, means for mounting the frame upon railroad trucks, and independent means for bracing below and supporting the frame upon the ties of the railroad track, one of said independent supporting means being placed adjacent the saw mounting and rigidly braced to prevent injury to the saw in case the car becomes derailed in transit, the said independent means also comprising a block positioned on the ends of the ties of the railroad track and wedges positioned in complementary relation for supporting the supporting means on the said blocks, substantially as set forth.

6. A saw mill comprising a frame mounted upon railroad trucks, a saw mounted upon the frame and means for quickly leveling the frame and holding it in a fixed position whereby the frame may be rigidly mounted and the car also may be quickly moved from one sawing station to another, the said means comprising a plurality of transverse bracing beams below the frame and a plurality of wedges adapted to be driven between the lower edge of the beams and the tops of the ties of the railroad track, one set of said transverse beams serving as a support for an engine by means of which the saw and other mechanism are driven, substantially as set forth.

7. A saw mill comprising a frame mounted upon railroad trucks, a saw mounted upon the frame, a pair of beams secured beneath and transversely of the frame, an engine mounted to rest upon the beams, and means for leveling the frame, said means serving to support the beams partly upon the railroad track to hold the frame in fixed position, and additional means for leveling and holding the frame in fixed position whereby the frame may be rigidly mounted, the said supporting and leveling means being quickly removable whereby the car may be quickly moved from one sawing station to another, substantially as set forth.

In witness whereof, we have hereunto set our hands at Elizabeth City, North Carolina this 3rd day of July, A. D. nineteen hundred and twenty-nine.

LEMUEL ROSCOE FOREMAN.
JAMES W. FOREMAN.